(12) United States Patent  
Frutschi

(10) Patent No.: US 7,104,749 B2  
(45) Date of Patent: *Sep. 12, 2006

(54) INTAKE SILENCER FOR GAS TURBINES

(75) Inventor: Hans Ulrich Frutschi, Riniken (CH)

(73) Assignee: ALSTOM Technology Ltd., Baden (CH)

( * ) Notice: Subject to any disclaimer, the term of this patent is extended or adjusted under 35 U.S.C. 154(b) by 122 days.

This patent is subject to a terminal disclaimer.

(21) Appl. No.: 10/717,712

(22) Filed: Nov. 21, 2003

(65) Prior Publication Data

US 2004/0103667 A1 Jun. 3, 2004

(30) Foreign Application Priority Data

Nov. 25, 2002 (DE) .................................. 102 54 824

(51) Int. Cl.  
*F02C 7/143* (2006.01)  
*F02C 7/24* (2006.01)

(52) U.S. Cl. .................... 415/1; 415/116; 415/117; 415/119; 60/39.53; 181/214; 181/221; 181/222; 181/261; 239/426; 239/434; 239/590.5

(58) Field of Classification Search .................. 415/1, 415/116, 117, 119; 60/39.53, 728, 775; 239/14.1, 426, 433, 434, 590.5; 181/213–214, 181/220–222, 260–261  
See application file for complete search history.

(56) References Cited

U.S. PATENT DOCUMENTS

| 2,749,998 | A |   | 6/1956 | Walton et al. |
|---|---|---|---|---|
| 2,869,670 | A | * | 1/1959 | Hoffman ..................... 181/229 |
| 2,974,482 | A | * | 3/1961 | Kelley ........................ 60/39.53 |
| 3,710,889 | A | * | 1/1973 | Lamy ......................... 415/119 |
| 3,785,625 | A |   | 1/1974 | Engalitcheff, Jr. |
| 3,839,846 | A |   | 10/1974 | Teller |
| 4,204,586 | A |   | 5/1980 | Hani et al. |
| 4,667,769 | A |   | 5/1987 | Appel |
| 4,773,846 | A |   | 9/1988 | Munk |
| 4,828,175 | A | * | 5/1989 | Heufler et al. ............. 415/119 |
| 4,845,952 | A |   | 7/1989 | Beebe |
| 5,140,819 | A |   | 8/1992 | Napier et al. |
| 5,782,080 | A | * | 7/1998 | Illbruck ....................... 60/728 |
| 5,809,770 | A | * | 9/1998 | Jahn ........................... 415/119 |
| 5,867,977 | A |   | 2/1999 | Zachary et al. |

(Continued)

FOREIGN PATENT DOCUMENTS

DE 696 07 471 5/1998

(Continued)

OTHER PUBLICATIONS

Search Report from EP 03 10 4164 (Nov. 11, 2004).

*Primary Examiner*—Christopher Verdier  
(74) *Attorney, Agent, or Firm*—Cermak & Kenealy, LLP; Adam J. Cermak

(57) ABSTRACT

A silencer (25*a*) for the attenuation of noise occurring in an intake airstream (10, 27) of a gas turbine (1–3) includes a device or devices (31, 32, 33, 34) for the introduction of water and/or steam into the intake airstream (10, 27). These devices may be designed, in particular, in the form of Venturi tubes (31), the water (29) being supplied, in particular above the saturation limit, to the airstream (27) via nozzles (33) arranged at the narrowest point. In this way, the silencing can be combined at the same time with the introduction of water for increasing the power output or for the general regulation of the gas turbine, this being achieved with a comparatively simple design.

13 Claims, 6 Drawing Sheets

U.S. PATENT DOCUMENTS

| | | |
|---|---|---|
| 5,930,990 A | 8/1999 | Zachary et al. |
| 6,027,305 A | 2/2000 | Ng et al. |
| 6,216,443 B1 | 4/2001 | Utamura |
| 6,378,284 B1 | 4/2002 | Utamura |
| 6,886,345 B1 * | 5/2005 | Ritland ................ 60/775 |
| 2001/0032477 A1 | 10/2001 | Schlom et al. |
| 2004/0105755 A1 | 6/2004 | Bolis et al. |

FOREIGN PATENT DOCUMENTS

| | | |
|---|---|---|
| DE | 199 13 681 A1 | 10/2000 |
| EP | 1 422 403 A1 | 5/2004 |
| JP | 2000320835 | 11/2000 |
| JP | 2000352320 | 12/2000 |
| WO | 99/44722 | 9/1999 |
| WO | 00/50739 | 8/2000 |

* cited by examiner

Figure 1:
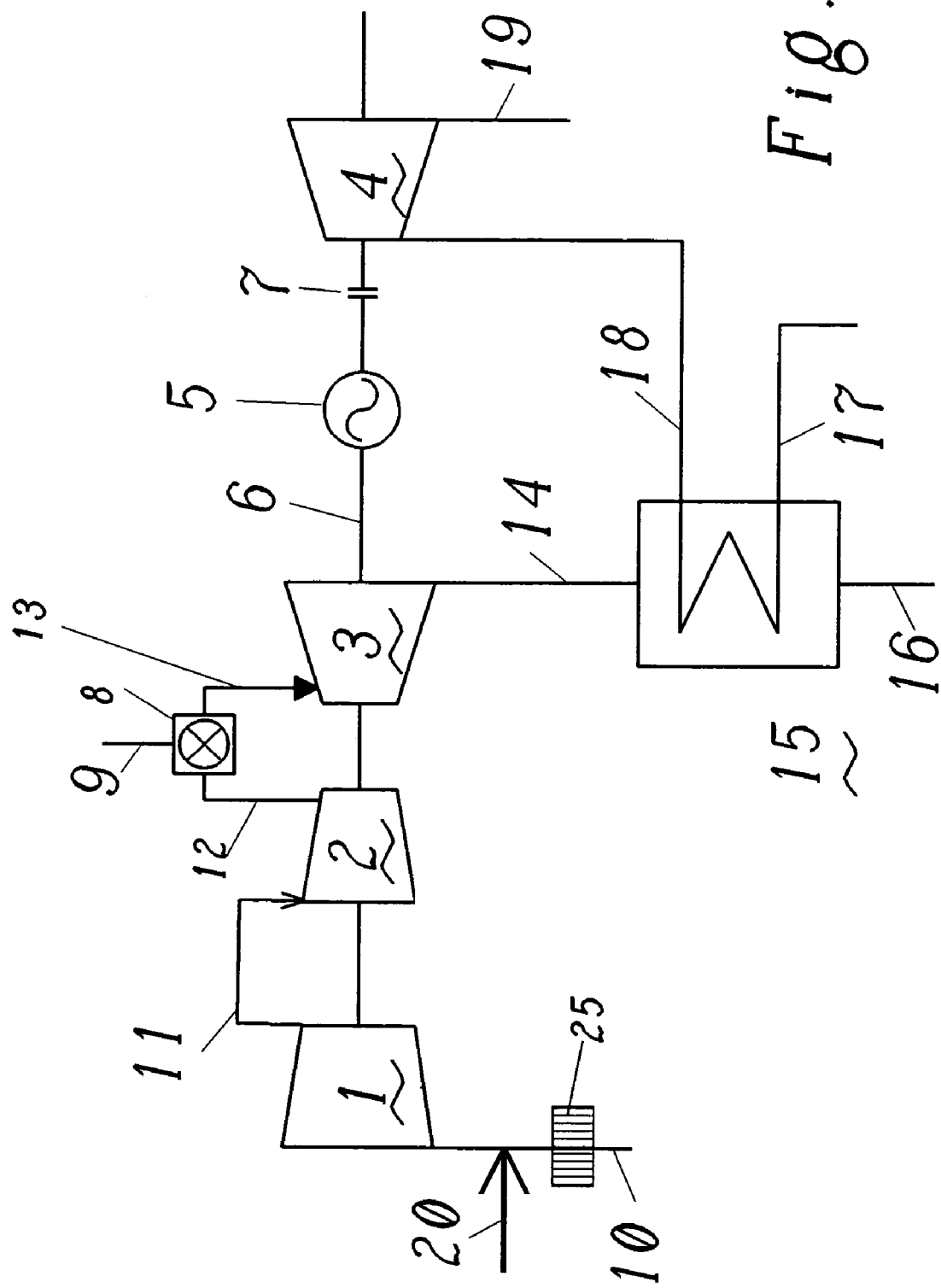
Figure 2B:
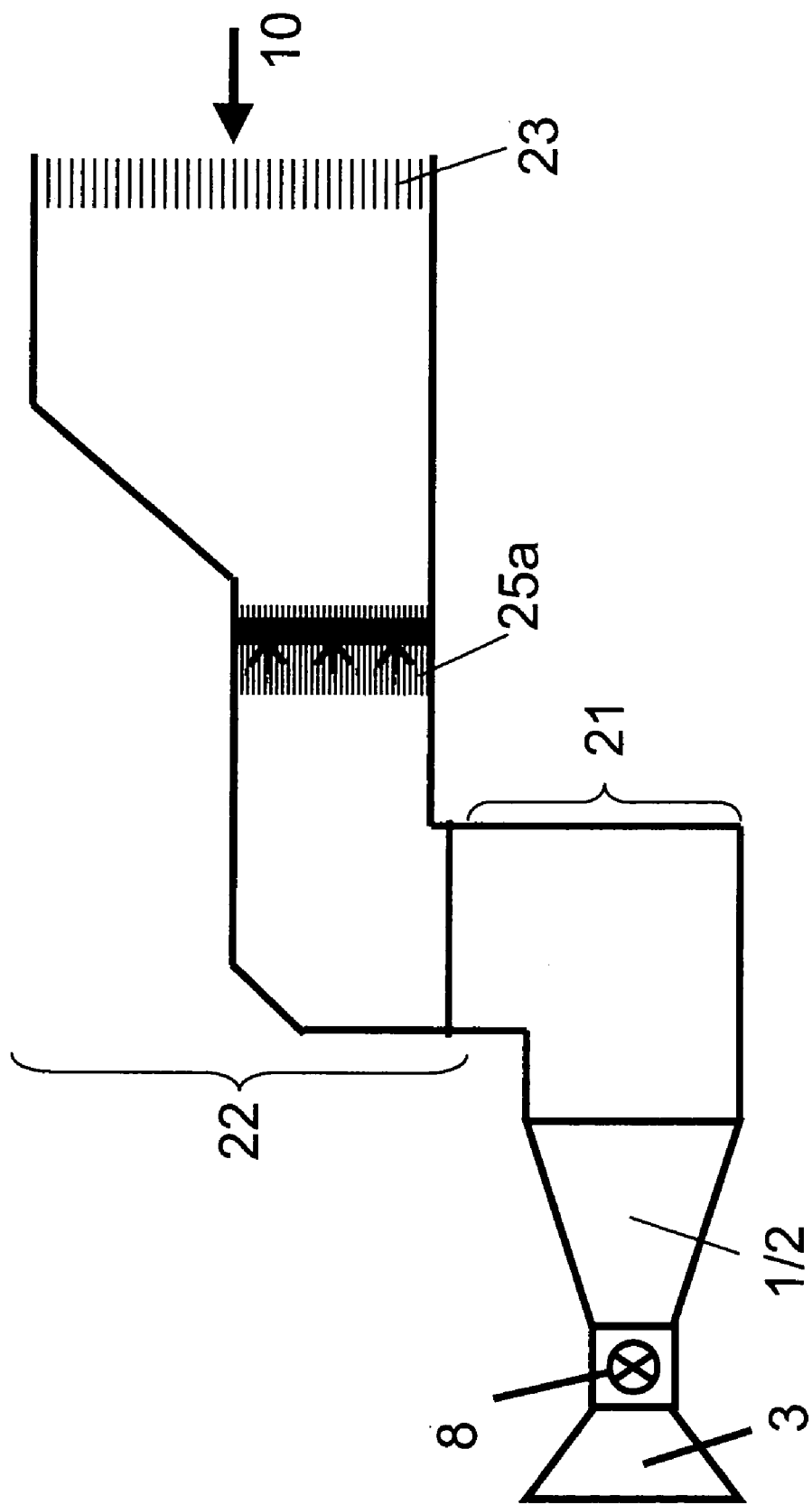

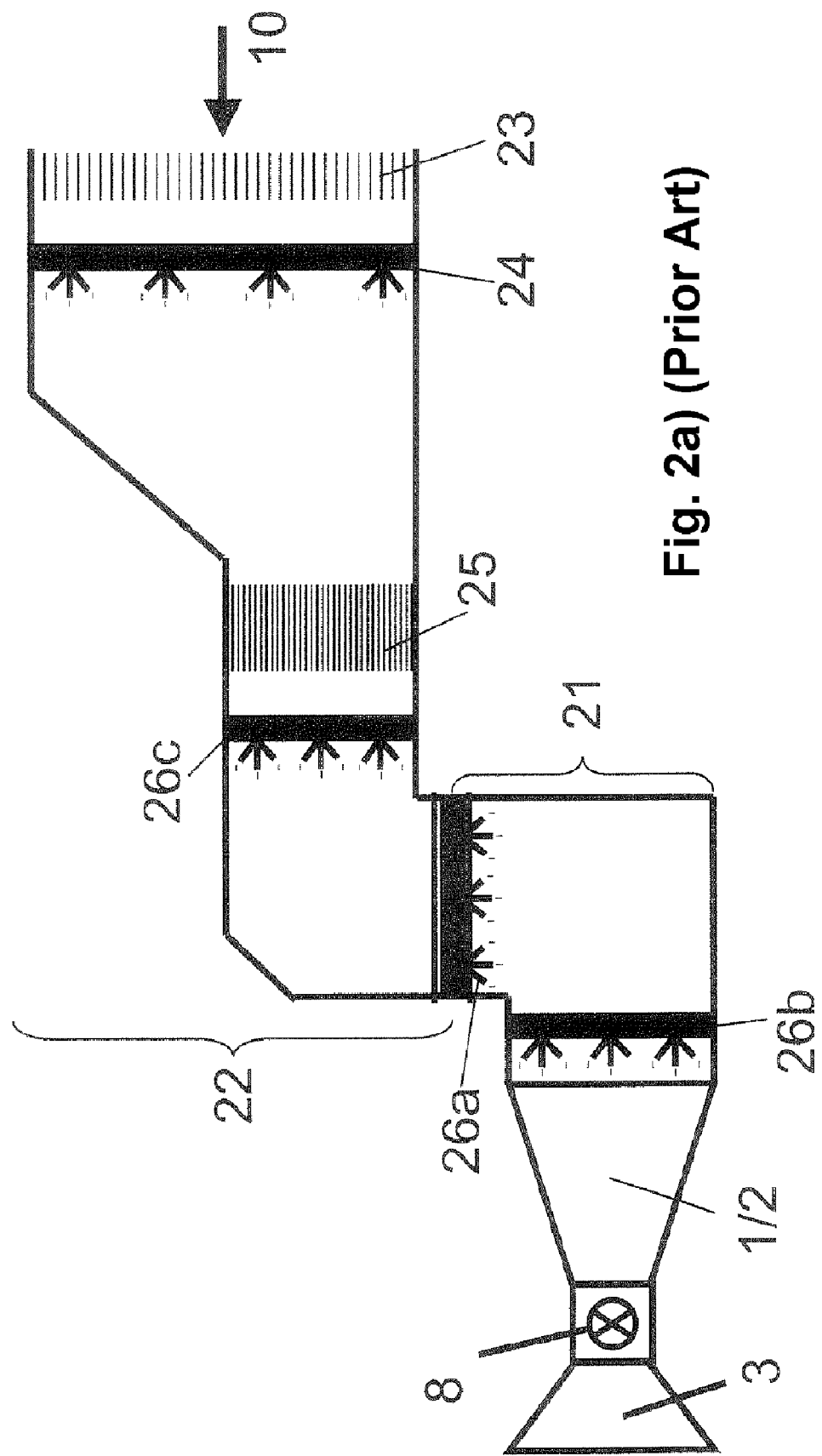
Fig. 2a) (Prior Art)

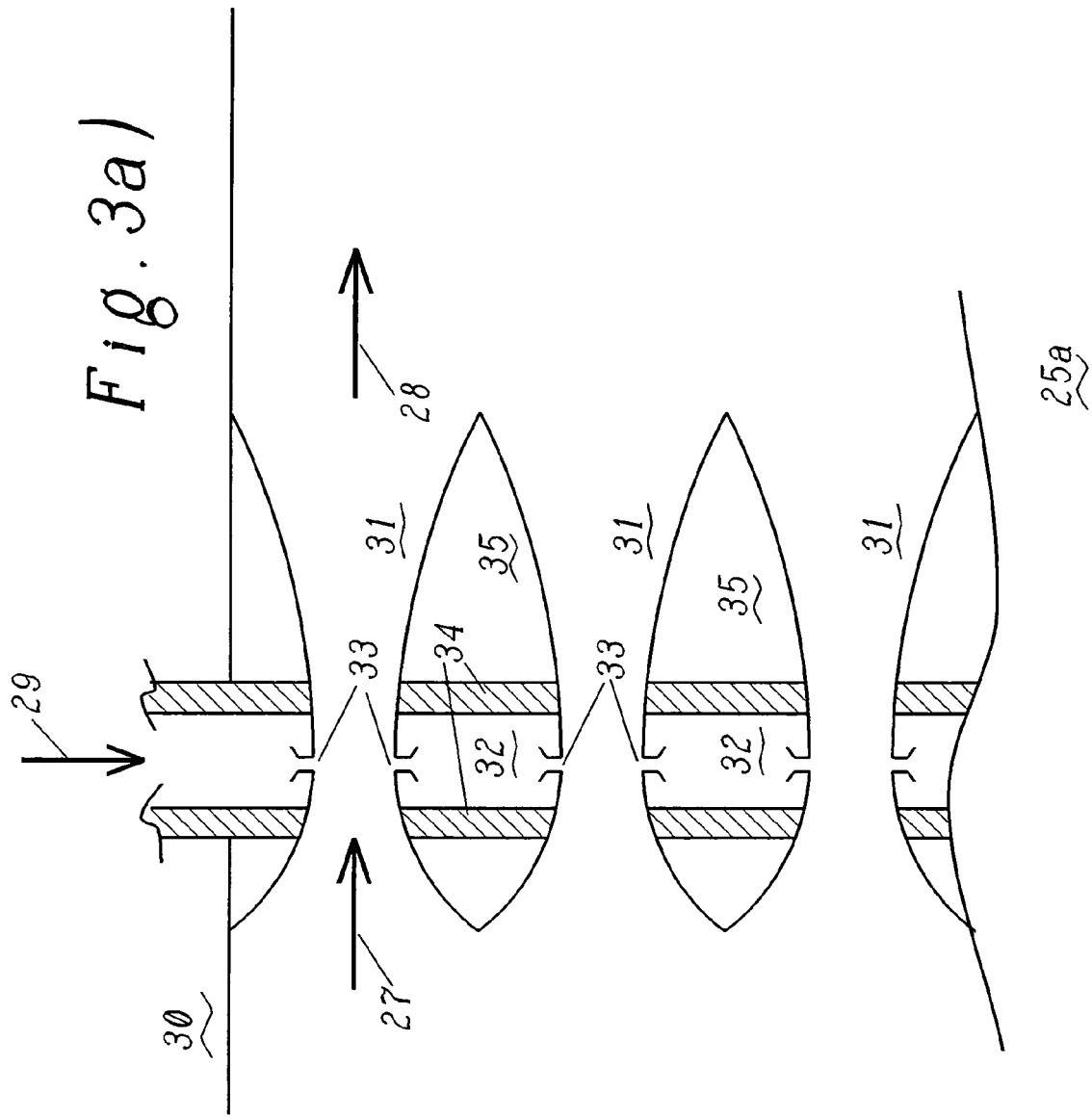

INTAKE SILENCER FOR GAS TURBINES

TECHNICAL FIELD

The present invention relates to a silencer for the attenuation of noise in an intake airstream of a gas turbine.

PRIOR ART

The combustion air for a gas turbine is typically sucked in via an intake duct, compressed in a compressor and subsequently supplied to a combustion chamber. The high flow velocities in the intake airstream, together with the turbulences occurring at the same time, lead to high-frequency noise. Conventionally, therefore, the intake duct of gas turbines has arranged in it not only filters, but, in addition, silencers which are designed specifically for this purpose and which on one side reduce the turbulences which occur and at the same time are capable of absorbing the existing sound. Typically, with regard to this sound, standards must be fulfilled in order actually to obtain an operating permit.

Accordingly, there is a multiplicity of documents which describe specific designs of silencers of this type specifically for gas turbines. Thus, for example, U.S. Pat. No. 4,204,586 of BBC, which describes a silencer for the attenuation of sound in the introduction of intake air into an annular chamber directly upstream of the compressor. Further documents to be mentioned are U.S. Pat. No. 4,667,769, U.S. Pat. No. 2,749,998 and U.S. Pat. No. 2,869,670 which indicate further specific designs of silencers. Moreover, special designs for regions in which the intake airstream is deflected are known, as illustrated, for example, in U.S. Pat. No. 5,140,819.

The silencers typically used nowadays consist essentially of a multiplicity of cylindrical tubular portions which are arranged next to one another in parallel and through which the intake air is forced to pass. In this case, turbulences are prevented or reduced, and sound is absorbed, in particular, by corresponding coatings or foam fillings.

PRESENTATION OF THE INVENTION

The object on which the invention is based is, therefore, to propose an alternative, structurally simple silencer for preventing the generation of noise in the intake duct of a gas turbine.

This object is achieved in that the silencer has means for the introduction of water and/or steam into the intake airstream.

The essence of the invention is, therefore, not, as is customary according to the prior art, to arrange a silencer in the intake air duct and, if there is a corresponding requirement, additionally, a separate water spraying device for the introduction of water and/or steam into the intake air, but, instead, to integrate a water spraying device directly into the silencer. To be precise, it is shown, surprisingly, that the flow conditions in the region of a silencer are particularly suitable for the introduction of water and/or steam, and that, particularly in the introduction of small drops, this introduction is assisted or improved by the elements of the silencer.

Moreover, by water being sprayed in, the silencing action of a silencer of this type is improved. Water spraying devices are used in order to increase the power output of gas turbines, since, by their use, the mass flow is increased and the temperatures are lowered, and therefore higher firing, with the same material load, becomes possible.

Water may in this case be supplied either in the form of steam, that is to say in the form of air humidification, or else in the form of small drops. In other words, water may also be supplied above the saturation limit. This technique, which is known as over-fogging, is usually carried out by the small liquid drops of a defined size being supplied to the airstream which is introduced into the compressor (what is known as "wet compression"). This technique makes it possible to increase the available power output of the gas turbine, because the work necessary for compressing the inlet air is reduced. This is because the evaporation energy of the inlet airstream cools the latter when it passes through the compressor stages. This always happens, in principle, in the case of aeronautical turbines in rainy weather.

There is a multiplicity of documents which describe this wet compression, as it is known, in connection with gas turbines. Thus, for example, U.S. Pat. No. 5,930,990 and its continuation-in-part, U.S. Pat. No. 5,867,977, which both describe an apparatus and a method for increasing the power output of a gas turbine, using wet compression. On the other hand, WO 00/50739 describes a special device for the monitoring of destructive wet compression, that is to say a device which monitors the distortions of the gas turbine which occur during this method and, if appropriate, controls the supply of water accordingly. Another document in this connection is U.S. Pat. No. 6,216,443 which likewise describes a device by means of which small liquid drops are introduced into the inlet airstream of the compressor, this introduction taking place between the compressor and downstream of a silencer. The drops which are supplied to the airstream have in this case a specific drop size of between 1 micrometer and 50 micrometers. A further publication of the same Applicant, U.S. Pat. No. 6,378,284, the parent application to U.S. Pat. No. 6,216,443 mentioned, describes a gas turbine in which liquid drops are added to the airstream upstream of the compressor, these liquid drops evaporating at least partially prior to entry into the compressor and consequently cooling the airstream, and subsequently evaporating completely in the compressor, with the airstream being cooled further. The liquid drops are in this case introduced into the airstream downstream of an inlet plate with air slits, downstream of which inlet plate an air filter or a silencer is also normally arranged. In all these documents, however, the silencer and the water spraying device are always designed as separate units in the intake air path.

By means of the device according to the invention, either the use of a further silencer in the inlet airstream may be dispensed with entirely or else it is possible to combine a silencer of this type with an already existing silencer and thus further reduce the harmful sound level. Likewise, a device according to the invention either may be used without further water spraying devices in the intake air path or else it is possible to combine a silencer of this type having an integrated water spraying device with further over-fogging grids. Thus, surprisingly, in a structurally simple modification, either a further silencer and/or a further water spraying device may be dispensed with or else the harmful sound level may be further reduced. Accordingly, a silencer of this type is especially suitable in connection with the retro fitting of already existing plants.

A first preferred embodiment of the silencer according to the invention is distinguished in that the silencer is designed as a plurality of tubular elements arranged essentially parallel to the direction of flow of the intake airstream. In this case, the cavities between the elements may be designed with a silencing action, which may be implemented, for example, with the aid of special coatings or with the aid of foam fillings with absorbent material.

According to a further preferred embodiment, water and/or steam is introduced into the intake airstream via nozzles, the nozzles being arranged on the inside of the tubular elements and injecting the water into the inner space, and preferably at least two nozzles being present, distributed on the circumference, for each element. By the nozzles being arranged on the inside of the tubes, the synergistic effect of the combination of silencer and water spraying device can be optimally implemented. The flow conditions inside the tube are especially suitable for the introduction of water drops. Even better, water drops are introduced where the tubular elements have a variable diameter along their length, and, particularly preferably, they have a narrowing in the middle region, the narrowing being designed particularly in such a way that the elements have essentially the same diameter on the inlet side and on the outlet side and have a diameter smaller by 20 to 30% in the middle region. These are, in other words, what are known as Venturi tubes, in which an increased flow velocity arises in the region of the reduced diameter, and because of this the arrangement of the nozzles at this point especially improves the distribution of water into the airstream.

Another preferred embodiment of the silencer according to the invention has at least two carrying walls which are arranged essentially perpendicularly to the direction of flow of the intake airstream and between which walls the water is supplied. Typically, in a design of this type, the tubular elements are incorporated in a way whereby they pass through the walls.

Figure 3B:
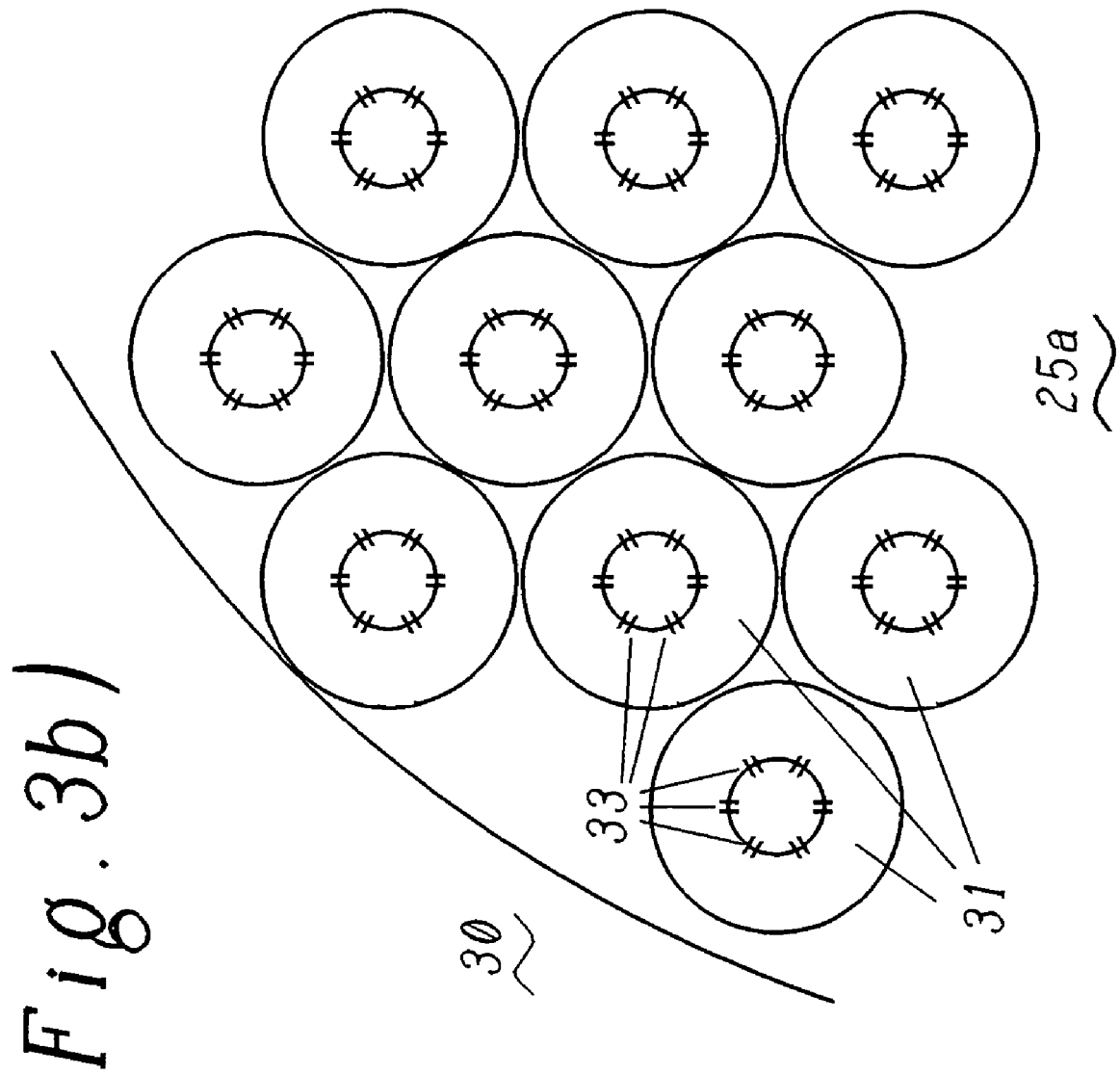

Particularly for the especially efficient over-fogging, as it is known, already mentioned initially, it proves advantageous to design the nozzles in such a way that water with a droplet size in the range of 10 to 50 μm is injected into the intake airstream, the injected water quantity particularly preferably being dimensioned beyond the saturation limit (what is known as over-fogging).

Moreover, the present invention relates to a method for increasing the power output or regulating the power output of a gas turbine, using a silencer, such as is described above. In particular, in this case, the silencer injects the water into the intake airstream essentially directly upstream of a first compressor stage and/or of a second compressor stage and, if appropriate, downstream of a further silencer and, if appropriate, downstream or upstream of a further water spraying device.

BRIEF EXPLANATION OF THE FIGURES

The invention will be explained in more detail below with reference to exemplary embodiments, in conjunction with the drawings, in which:

FIG. 1 shows a diagrammatic illustration of a gas turbine plant with two compressor stages;

FIG. 2*a*) shows a further diagrammatic illustration of a gas turbine plant and of its air supply to the compressor; b) shows an illustration according to FIG. 2*a*) with a silencer according to the invention;

FIG. 3*a*) shows a section through a silencer perpendicularly to the airstream; b) shows a view, parallel to the airstream, of a silencer according to FIG. 3*a*); and FIG. 4 shows a detailed part section through an individual Venturi element of a silencer.

EMBODIMENTS OF THE INVENTION

FIG. 1 shows a diagrammatic illustration of a gas turbine plant, in which a silencer according to the invention may typically be used. The plant has a first compressor stage 1, which brings the intake air 10 to a first pressure stage, and a second compressor stage 2, in which the partially compressed intake airstream 11 is raised to the final pressure stage. The fully compressed intake air 12 is subsequently supplied to a combustion chamber 8 in which fuel 9 is burnt. The hot combustion gases 13 are delivered to a gas turbine 3 and expanded in the latter, and the expanded hot gases 14 occurring in this process are cooled further in a waste-heat boiler 15 following the gas turbine 3 and are discharged into the environment only downstream of said waste-heat boiler via a chimney 16. The two compressor stages 1 and 2 and the gas turbine 3 are arranged on a common shaft 6, and this shaft 6 drives a generator 5. In the waste-heat boiler 15, water 17 supplied is heated and evaporated in a process which, if appropriate, can be a multistage process, and the steam 18 which occurs is expanded in a steam turbine 4 for further energy recovery. The steam turbine 4 may either be connected to a separate generator or else, as illustrated in FIG. 1, drive the same generator 5 via a coupling 7 on the common shaft 6.

To suppress the noise occurring in the intake duct, a silencer 25 is arranged in the intake duct. Moreover, typically, to increase the power output, water 20 is supplied in droplet form to the intake airstream 10 via a separate water spraying device. FIG. 1 illustrates how water is supplied upstream of the first compressor stage 1 and directly downstream of the silencer 25, but it is alternatively or additionally possible also to introduce water into the path of the partially compressed intake air 11.

FIG. 2*a*) shows a diagrammatic illustration of the intake air path of a gas turbine plant according to FIG. 1 according to the prior art. Typically, the intake air 10 is first led through a filter 23, and, if appropriate, this filter may be preceded by a wall or plate provided with air slits. Likewise located in the path of the intake air 10 is a silencer 25 which is to suppress the noise occurring during intake. Water spraying devices can conventionally be mounted at various points along an intake path of this type. On the one hand, it is possible to mount them, for example, in the form of a cooling unit 24 downstream of the filter 23 and upstream of the silencer 25. Alternatively or additionally, it is possible to arrange water spraying devices of this type downstream of the silencer 25. In this case, as illustrated in FIG. 2, where a curved path is concerned, water-fogging grids of this type may be arranged at various points where first an intake air duct 22 is present at a higher level and, after a deflection, there is an intake air collector 21. Either within the intake air duct 22 directly downstream of the silencer 25, as indicated by the reference symbol 26*c*, or else directly at the point of the deflection according to reference symbol 26*a* or essentially directly upstream of the entry into the compressor 1/2, as indicated by the reference symbol 26*b*.

FIG. 2*b*) shows, by way of example, how a silencer 25*a* according to the invention can be used in an intake air path of this type. As already mentioned initially, the silencer according to the invention has an integrated device for spraying water or small drops. Thus, the number of components in the intake air path is reduced, and, in principle, there is no longer any need for further water spraying devices in order to make it possible to increase the power output of the gas turbine.

How a silencer 25a according to the invention, which also acts at the same time as a water spraying device, can actually be designed is illustrated by way of example in FIG. 3. The intake air silencer 25a in this case comprises tubular elements which are designed in FIG. 3 as Venturi tubes 31. In other words, the elements 31 are not cylindrical elements, but, instead, tubes which have a narrowing in the middle region. The flow velocity in this region of the narrowing is in this case substantially higher than at entry into or exit from the tube. The individual Venturi tubes 31 are arranged next to one another in parallel in the direction of flow of the intake air. The individual Venturi tubes 31 may have a circular cross section, as illustrated in FIG. 3b), but it is also possible, in order to allow as close a packing as possible, to design the individual elements with a polygonal cross section, for example as a hexagon, so that a honeycomb-like arrangement can be implemented, in which the interspaces are as small as possible. As can be seen in FIG. 3a, the carrying structure of a device of this type is implemented by at least two walls 34.

The supply of the water 29 can be implemented in a simple way between the two walls 34 arranged parallel to one another and perpendicularly to the airstream. The two walls 34 correspondingly have bores into which the Venturi tubes 31 are incorporated or welded. The intake air 27 enters the individual elements, and, due to the narrowing of the cross section, the flow velocity rises in the region of this narrowing. In the region of the narrowing, on the circumference, individual nozzles 33 are arranged, through which the water 29 supplied is injected into the airstream flowing at high velocity. As can be seen in FIG. 3b), six nozzles, for example, are distributed on the circumference. In this case, the nozzles are preferably selected such that droplets of a size in the range of 1 to 50 μm are formed. The droplet formation is further assisted by the specific flow within the Venturi tube 31 at the narrowest point. Humidified air 28 correspondingly emerges downstream of the silencer 25a. Cavities 35 are formed in the interspace between the individual Venturi tubes 31. These cavities may be filled with appropriate materials for further assisting the silencing action. For example, special foam fillings are suitable for this purpose. Furthermore, the silencing action may be assisted by appropriate coatings known from the field of the construction of silencers of conventional type.

Figure 4:
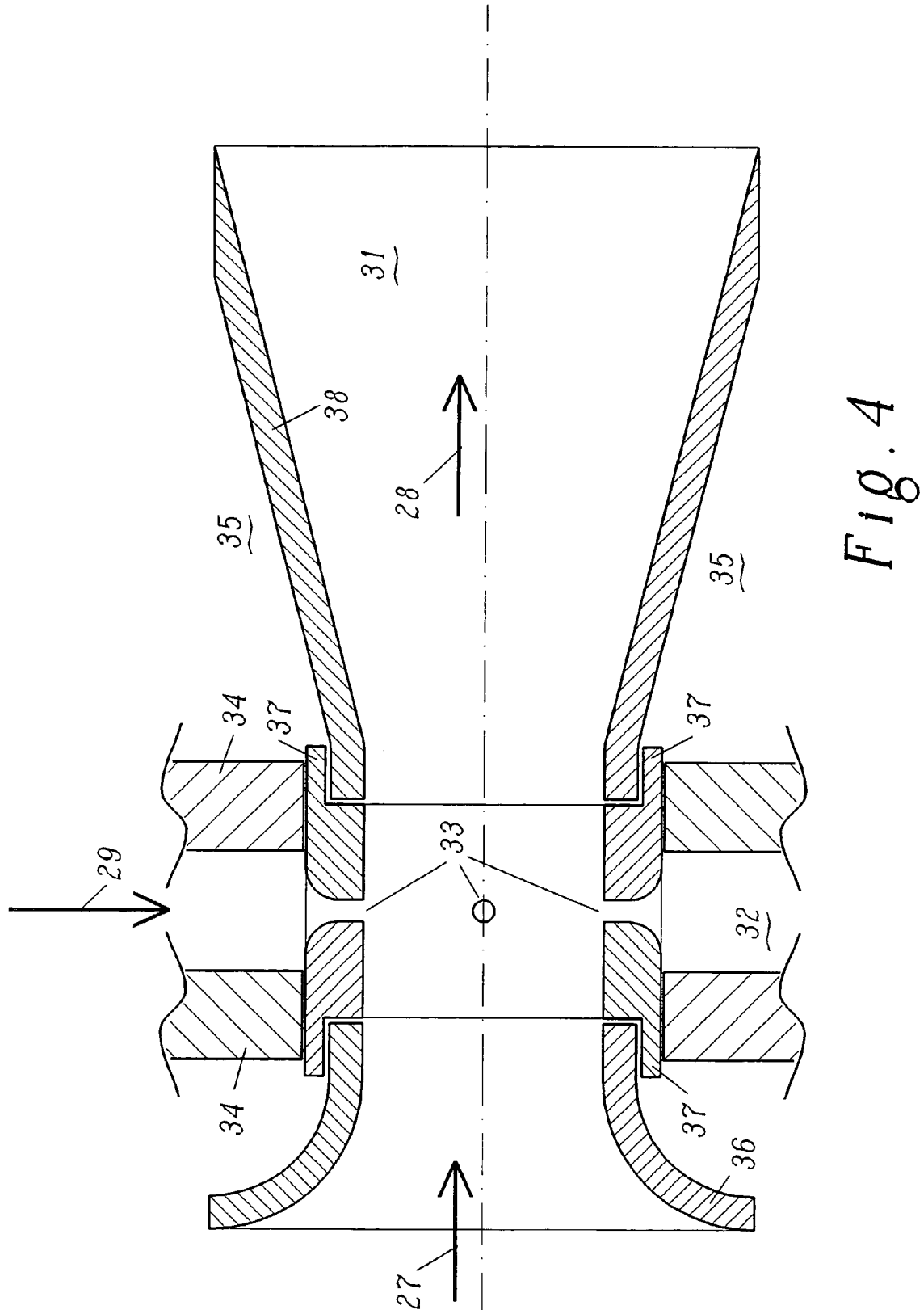

FIG. 4 shows a further exemplary embodiment of a specific form of construction of a Venturi tube 31 of this type, such as may be used in a silencer according to the invention. To form an entire silencer, Venturi tubes 31 of this type are arranged next to one another in as close a packing as possible. In this case, the Venturi tube 31 is composed of individual elements, in order to simplify construction. On the onflow side is located an inlet element 36 which has, as it were, a trumpet-shaped design. The tube 31 has, in its narrowed region, a cylindrical portion which is formed by an annular element 37. This annular element 37 has, in this case, distributed on its circumference, 4 bores which act as nozzles 33. Downstream of this annular element 37 is arranged an outlet element 38 which widens the flow cross section essentially to the flow cross section at entry into the element 36.

This form of construction allows a simple construction of such a silencer, since it is simply necessary to lead appropriately spaced-apart continuous bores into the two sidewalls 34 between which the water 29 is supplied. Subsequently, the annular elements 37, which have the orifices 33 to be made accurately, can be inserted into these bores and be welded to the walls 34. Or, alternatively, it is possible to provide the bores with an internal thread and the annular elements 37 with a corresponding external thread, so that the annular elements 37 can simply be screwed into the bores. Subsequently, on the onflow side, the inlet elements 36 are inserted into corresponding step-shaped widenings provided in the annular element 37, so that the inner wall of the tube 31 obtained becomes as smooth as possible. Again, the elements 36 may either be welded or screwed to the annular element 37. In a similar way, the outlet elements 38 are introduced, from the side facing away from the flow, into corresponding widenings of the annular element 37 and are firmly connected to the latter.

Typically, Venturi tubes 31 of this type have a diameter at entry and exit in the range of 20 to 100 mm and, in the narrowed region, a diameter of 10 to 50 mm. Normally, the ratio between the diameter at entry and the narrowest point should not be greater than 2, so that the flow resistance occurring along the intake path due to the narrowing and the associated efficiency losses do not become too great.

List of Reference Symbols 1 first compressor stage (low pressure)
2 second compressor stage (high pressure)
3 gas turbine
4 steam turbine
5 generator
6 shaft
7 coupling
8 combustion chamber
9 fuel line, fuel
10 intake air
11 partially compressed intake air
12 compressed air
13 hot combustion air, hot gas
14 exhaust gas
15 waste-heat boiler
16 chimney
17 line to the waste-heat boiler (water)
18 line from the waste-heat boiler (steam)
19 outlet of the steam turbine
20 supply of water to the intake air
21 intake air collector
22 intake air duct
23 filter
24 cooling unit
25 silencer
25a intake silencer with water injection
26 water-fogging grid
27 intake air upstream of the fogging grid
28 humidified air downstream of the fogging grid
29 water supplied
30 sidewall of 21 or 22
31 Venturi tube
32 duct for 29
33 nozzles
34 sidewalls of 32
35 cavities between 31
36 inlet element of 31
37 annular elements
38 outlet element of 31

The invention claimed is:

1. A silencer for the attenuation of noise occurring in an intake airstream of a gas turbine comprising:
    means for the introduction of water, steam, or both, into the intake airstream;

a plurality of tubular elements arranged essentially parallel to the direction of flow of the intake airstream;
wherein each tubular element includes an inner space;
wherein the means for the introduction of water, steam, or both comprises nozzles configured and arranged to introduce water, steam, or both, into the intake airstream, the nozzles being arranged on the inside of the tubular elements and oriented to inject into the inner space of the tubular elements.

2. The silencer as claimed in claim 1, further comprising: cavities between the elements configured and arranged for a silencing action.

3. The silencer as claimed in claim 1, wherein the tubular elements each have a diameter that changes along their length.

4. The silencer as claimed in claim 3, wherein the tubular elements each comprise a narrowing in a middle region.

5. The silencer as claimed in claim 4, wherein each element includes an inlet side and an outlet side, and wherein the narrowing is configured and arranged so that the elements have substantially the same diameter on the inlet side and on the outlet side and have a diameter smaller by 20 to 30% in the middle region.

6. The silencer as claimed in claim 1, wherein the tubular elements each have a diameter that changes along their length and includes a narrowing in a middle section, and wherein the nozzles are arranged in the region of the narrowing.

7. The silencer as claimed in claim 6, wherein each element includes an inlet side and an outlet side, and wherein the narrowing is configured and arranged so that the elements have substantially the same diameter on the inlet side and on the outlet side and have a diameter smaller by 20 to 30% in the middle region.

8. The silencer as claimed in claim 1,
wherein the means for the introduction of water, steam, or both comprises means for injecting water with a droplet size in the range of 10 to 50 µm into the intake airstream.

9. The silencer as claimed in claim 8, wherein the means for injecting water comprises means for injecting a water quantity beyond the saturation limit.

10. A method for increasing the power output or regulating the power output of a gas turbine comprising:
providing said gas turbine with a silencer as claimed in claim 1; and
operating said silencer to increase or regulate the power output of said gas turbine.

11. The method as claimed in claim 10, further comprising:
injecting water with the silencer into the intake airstream
essentially directly upstream of a first compressor stage, or
essentially directly upstream of a second compressor stage, or
essentially directly upstream of both the first compressor stage and of the second compressor stage, and
optionally downstream of a further silencer, and
optionally
downstream of a further water spraying device, or
upstream of further water spraying device.

12. The silencer as claimed in claim 1, further comprising:
at least two nozzles circumferentially distributed for each tubular element.

13. A silencer for the attenuation of noise occurring in an intake airstream of a gas turbine comprising:
means for the introduction of water, steam, or both, into the intake airstream;
a plurality of tubular elements arranged essentially parallel to the direction of flow of the intake airstream; and
at least two carrying walls arranged essentially perpendicularly to the direction of flow of the intake airstream, between which at least two carrying walls the water, steam, or both, is to be supplied and into which at least two carrying walls the tubular elements are incorporated so that the tubular elements pass through the at least two carrying walls.

* * * * *